United States Patent
Song

(10) Patent No.: US 11,515,558 B2
(45) Date of Patent: Nov. 29, 2022

(54) COST-EFFICIENT HIGH ENERGY DENSITY REDOX FLOW BATTERY

(71) Applicant: ESS TECH, INC., Wilsonville, OR (US)

(72) Inventor: Yang Song, West Linn, OR (US)

(73) Assignee: ESS TECH, INC., Wilsonville, OR (US)

( * ) Notice: Subject to any disclaimer, the term of this patent is extended or adjusted under 35 U.S.C. 154(b) by 170 days.

(21) Appl. No.: 16/536,213

(22) Filed: Aug. 8, 2019

(65) Prior Publication Data

US 2020/0052317 A1    Feb. 13, 2020

Related U.S. Application Data

(60) Provisional application No. 62/717,625, filed on Aug. 10, 2018.

(51) Int. Cl.
*H01M 8/18* (2006.01)
*H01M 8/02* (2016.01)
*H01M 4/58* (2010.01)
*H01M 4/36* (2006.01)

(52) U.S. Cl.
CPC .......... *H01M 8/188* (2013.01); *H01M 4/368* (2013.01); *H01M 4/582* (2013.01); *H01M 8/02* (2013.01)

(58) Field of Classification Search
CPC ........ H01M 8/188; H01M 8/02; H01M 4/368; H01M 2300/0002; Y02E 60/50
See application file for complete search history.

(56) References Cited

U.S. PATENT DOCUMENTS

| | | | |
|---|---|---|---|
| 3,996,064 A * | 12/1976 | Thaller | H01M 10/42 320/128 |
| 4,192,910 A * | 3/1980 | Frosch | H01M 8/188 429/101 |
| 9,614,244 B2 | 4/2017 | Evans et al. | |
| 9,685,651 B2 | 6/2017 | Evans et al. | |
| 9,865,895 B2 | 1/2018 | Evans et al. | |
| 2014/0227574 A1* | 8/2014 | Savinell | H01M 10/38 429/107 |
| 2017/0179516 A1 | 6/2017 | Evans et al. | |
| 2018/0013164 A1 | 1/2018 | Evans et al. | |
| 2018/0316031 A1 | 11/2018 | Song et al. | |

(Continued)

FOREIGN PATENT DOCUMENTS

| | | |
|---|---|---|
| KR | 20180004998 A | 1/2018 |
| KR | 20180062553 A | 6/2018 |

OTHER PUBLICATIONS

Prifti, Helen, et al. "Membranes for redox flow battery applications." Membranes 2.2 (2012): 275-306. (Year: 2012).*

(Continued)

*Primary Examiner* — Matthew T Martin
*Assistant Examiner* — Grace Ann Kenlaw
(74) *Attorney, Agent, or Firm* — McCoy Russell LLP

(57) ABSTRACT

Methods and systems are provided for a redox flow battery system. In one example, the redox flow battery is adapted with an additive included in a battery electrolyte and an anion exchange membrane separator dividing positive electrolyte from negative electrolyte. An overall system cost of the battery system may be reduced while a storage capacity, energy density and performance may be increased.

10 Claims, 8 Drawing Sheets

(56) References Cited

U.S. PATENT DOCUMENTS

2018/0316035 A1 11/2018 Song et al.

OTHER PUBLICATIONS

Malkhandi, Souradip, et al. "Self-assembled monolayers of n-alkanethiols suppress hydrogen evolution and increase the efficiency of rechargeable iron battery electrodes." Journal of the American Chemical Society 135.1 (2013): 347-353. (Year: 2013).*
"Monolayer." Merriam-Webster.com Dictionary, Merriam-Webster, https://www.merriam-webster.com/dictionary/monolayer. Accessed Aug. 26, 2021. (Year: 2021).*
Xing, W., et al. "Mechanism of iron inhibition by stearic acid Langmuir-Blodgett monolayers." Corrosion 51.1 (1995): 45-49. (Year: 1995).*
Folkers, J. et al., "Self-Assembled Monolayers of Long-Chain Hydroxamic Acids on the Native Oxides of Metals," Langmuir, vol. 11, No. 3, Mar. 1, 1995, 12 pages.
Jayathilake, B. et al., "Improvements to the Coulombic Efficiency of the Iron Electrode for an All-Iron Redox-Flow Battery," Journal of the Electrochemical Society, vol. 165, No. 9, Jun. 2, 2018, 9 pages.
ISA Korean Intellectual Property Office, International Search Report and Written Opinion Issued in Application No. PCT/US2019/045798, dated Nov. 26, 2019, WIPO, 10 pages.
Baldassaro, P., "Low Temperature Phase Relations in the System $H2O$—$NaCl$—$FeCl2$," Master of Science in Geological Sciences Thesis, Virginia Polytechnic Institute and State University, May 8, 1998, 45 pages.
Marion, G. et al., "Modeling ferrous-ferric iron chemistry with application to martian surface geochemistry," Geochimica et Cosmochimica Acta, vol. 72, No. 1, Jan. 2008, 25 pages.
Song, Y. et al., "Cost-Efficient High Energy Density Redox Flow Battery," U.S. Appl. No. 16/536,237, filed Aug. 8, 2019, 52 pages.

* cited by examiner

COST-EFFICIENT HIGH ENERGY DENSITY REDOX FLOW BATTERY

CROSS REFERENCE TO RELATED APPLICATIONS

The present application claims priority to U.S. Provisional Application No. 62/717,625, entitled "COST-EFFICIENT HIGH ENERGY DENSITY REDOX FLOW BATTERY", and filed on Aug. 10, 2018. The entire contents of the above-listed application are hereby incorporated by reference for all purposes.

FIELD

The present description relates generally to methods and systems for a redox flow battery.

BACKGROUND AND SUMMARY

Redox flow batteries are suitable for grid scale storage applications due to their capability for scaling power and capacity independently, as well as for charging and discharging over thousands of cycles with reduced performance losses in comparison to conventional battery technologies. An all-iron hybrid redox flow battery is particularly attractive due to incorporation of low cost, earth-abundant materials. The iron redox flow battery (IFB) relies on iron, salt, and water for electrolyte, thus comprising simple, earth abundant, and inexpensive materials and eliminates incorporation of harsh chemicals thereby allowing the IFB to impose minimal negative impact on the environment.

However, the inventors herein have recognized that further reduction of overall system storage costs may be desirable in order to expand a viable commercial application of the IFB. An increased energy storage to unit cost ratio may be achieved by promoting formation of uniform, crack-free plated layers with an increased thickness at a negative electrode of the IFB system. An accessibility and performance of the IFB may thus be improved.

In one example, the issues described above may be addressed by a redox flow battery system comprising a battery cell with a positive electrolyte and a negative electrolyte, the positive electrolyte in contact with a positive electrode and the negative electrolyte in contact with a negative electrode, a plating additive added to the negative electrolyte, the plating additive interacting with cations of the negative electrolyte and forming complexes that plate onto the negative electrode in self-assembled monolayers.

In this way, an iron redox flow battery (IFB) system may be manufactured with a reduced cost of storage. Decreasing the cost of storage may include incorporating a plating additive in the IFB system to enable formation of thick, uniform, and uninterrupted plated layers on the negative electrode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 is shown approximately to scale, however, other dimensions may be used as desired.

DETAILED DESCRIPTION

Figure 1:
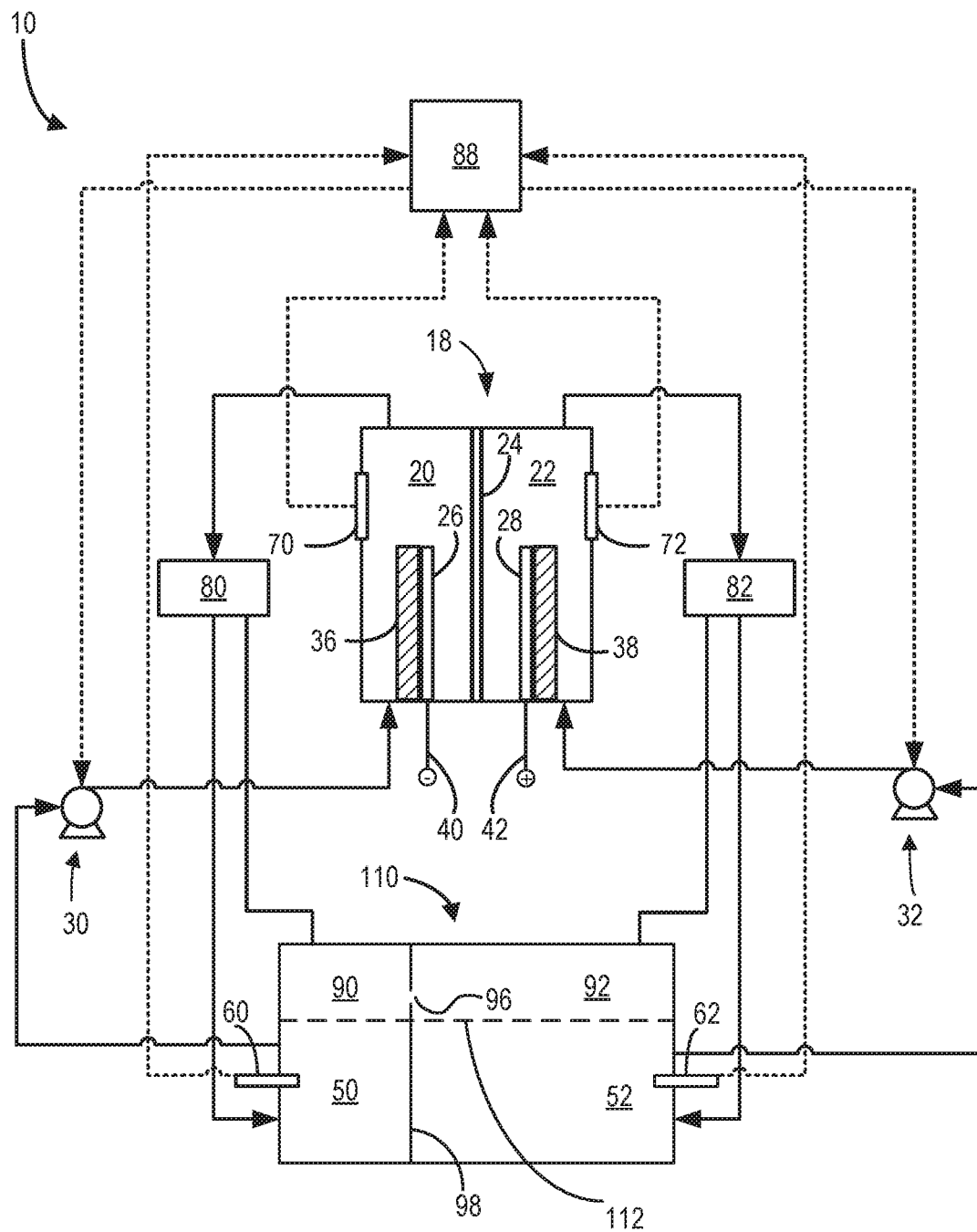
FIG. 1 shows a schematic of an example redox flow battery system including a battery cell with electrodes and a membrane separator.
Figure 2:
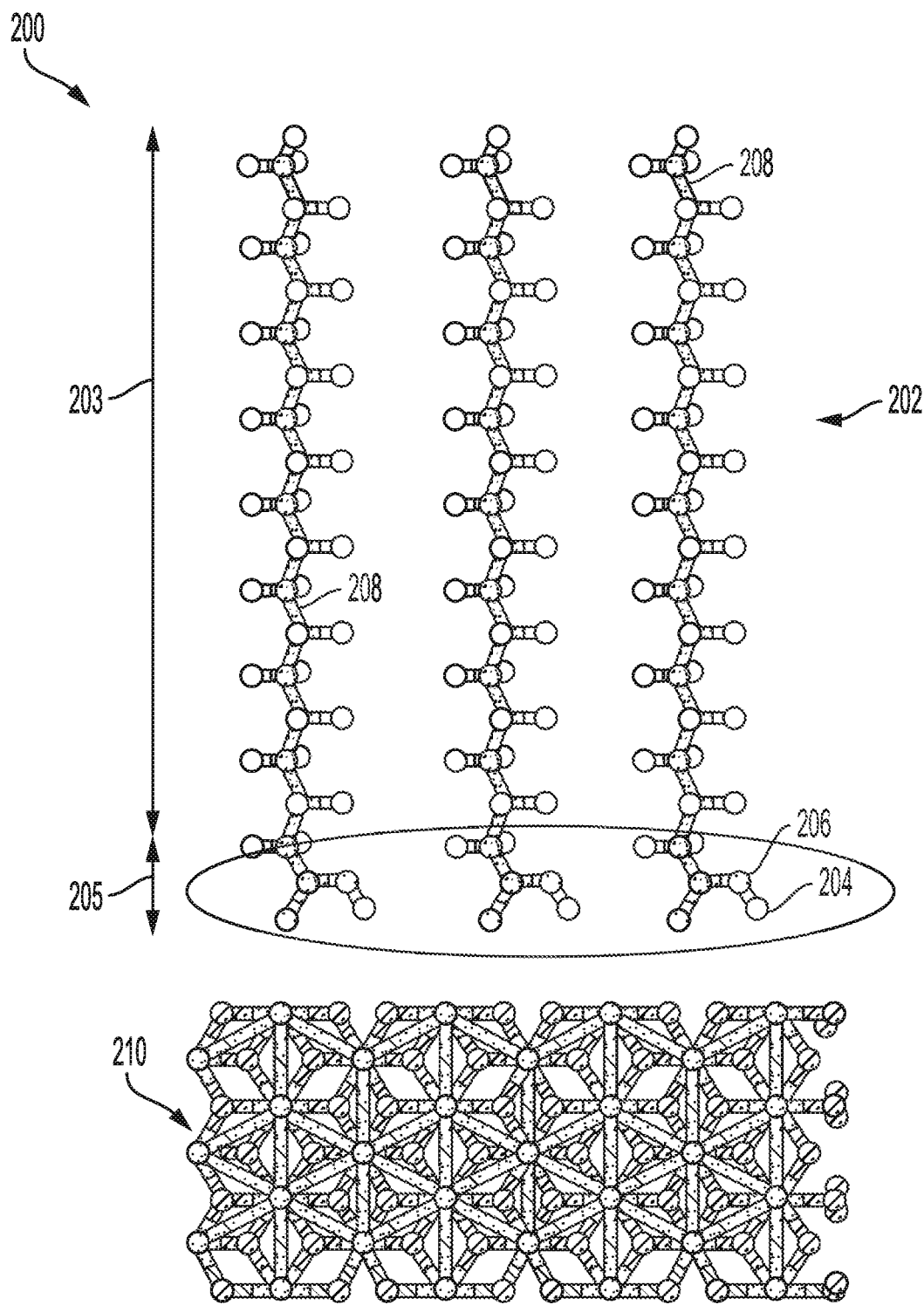
FIG. 2 shows an example model of a self-assembled monolayer of plated material for a plating electrode.
Figure 3:
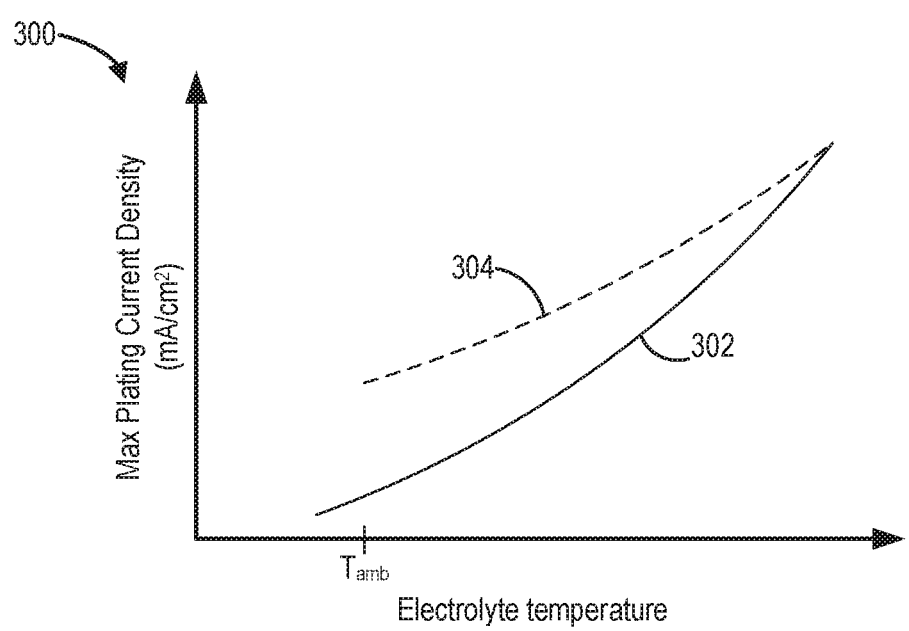
FIG. 3 shows a graph depicting an example comparison of a maximum plating current density onto a negative electrode versus electrolyte temperature between a conventional redox flow battery and a redox flow battery configured to plate material as self-assembled monolayers.
Figure 6:
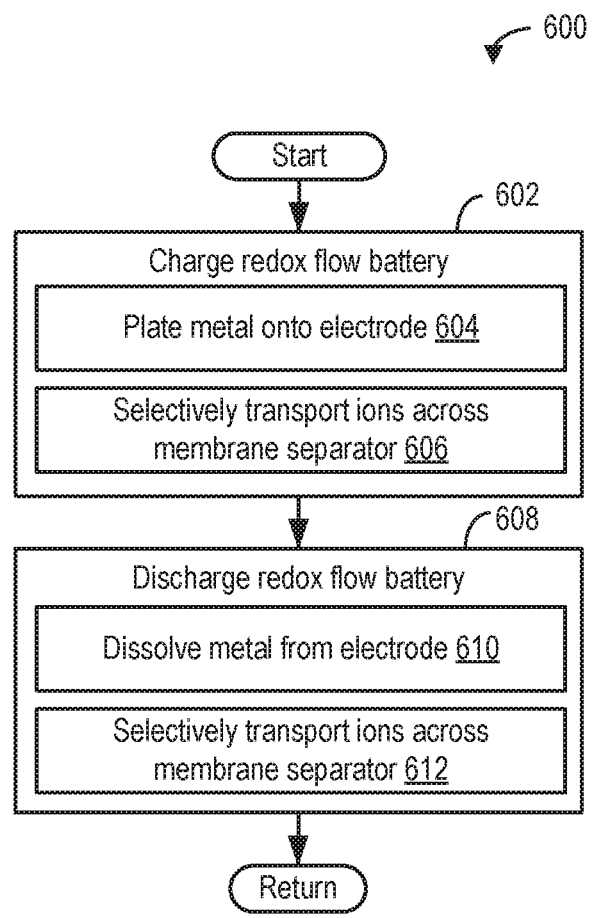
FIG. 6 shows an example of a method for charging and discharging the redox flow battery system.
Figure 7:
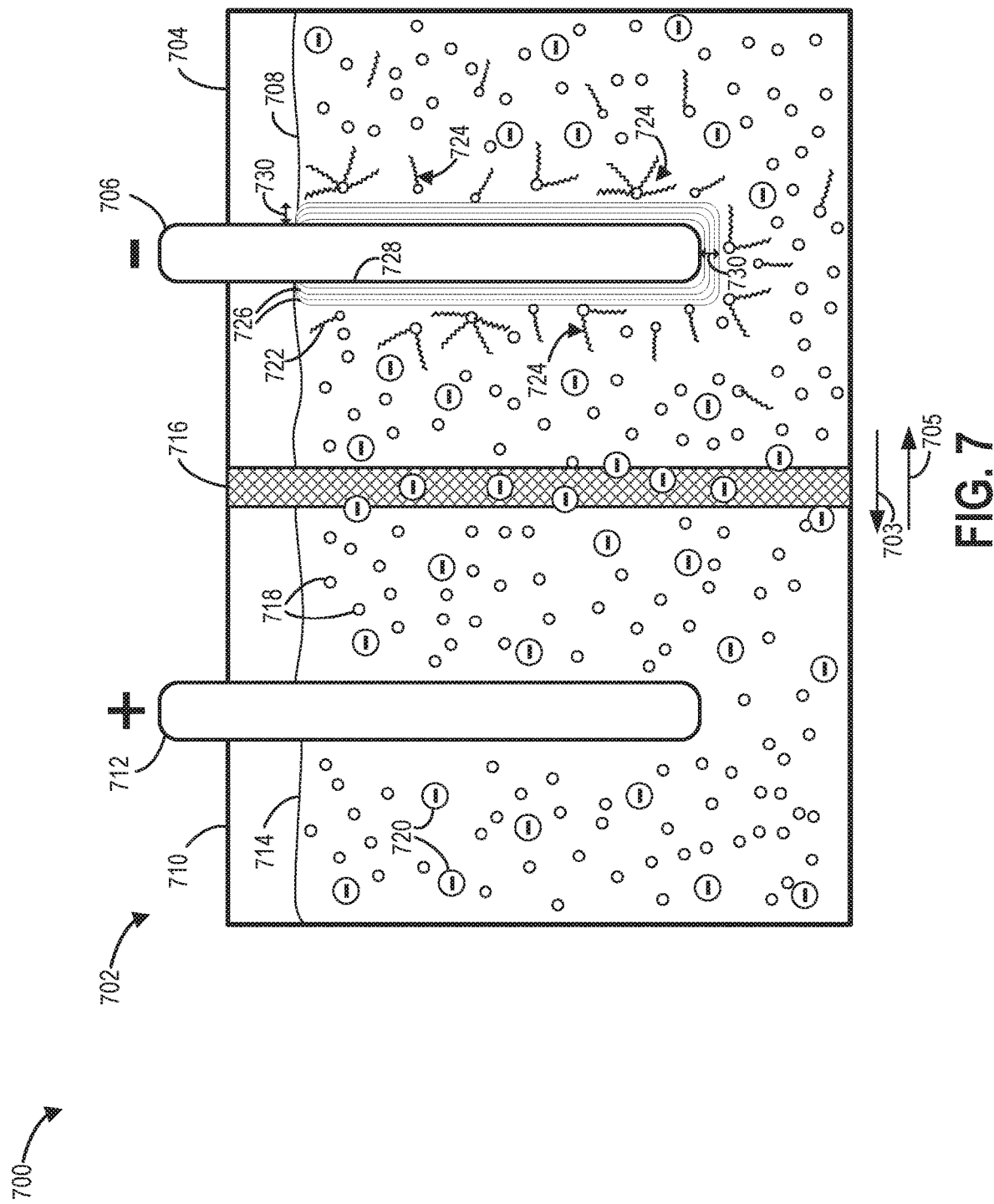
FIG. 7 shows a schematic diagram of an example of the battery cell of the redox flow battery including a negative electrode compartment, a positive electrode compartment, and the membrane separator.
Figure 9:
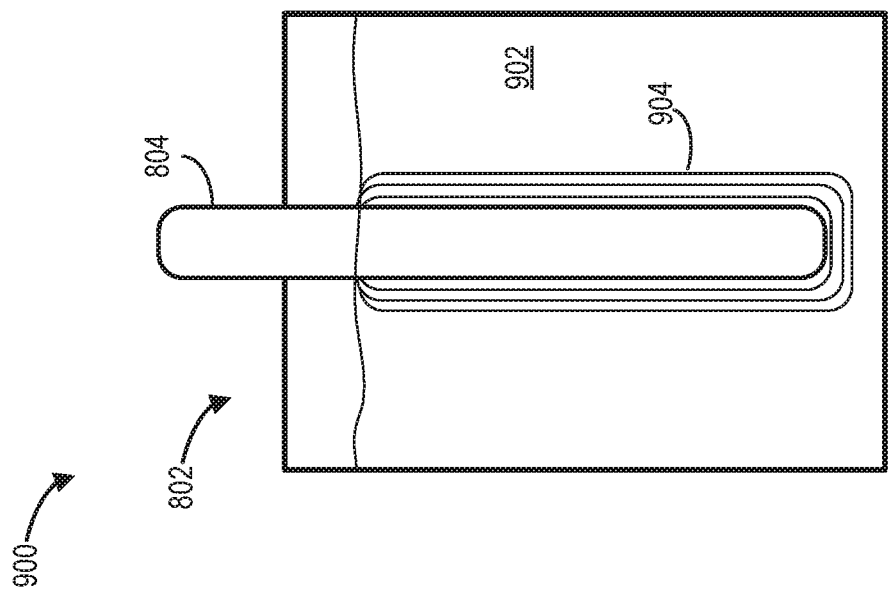
FIG. 9 shows a second schematic diagram of an example of the negative electrode compartment with the plating additive where the negative electrode is coated with crack-free coating of plated metal.
Figure 10:
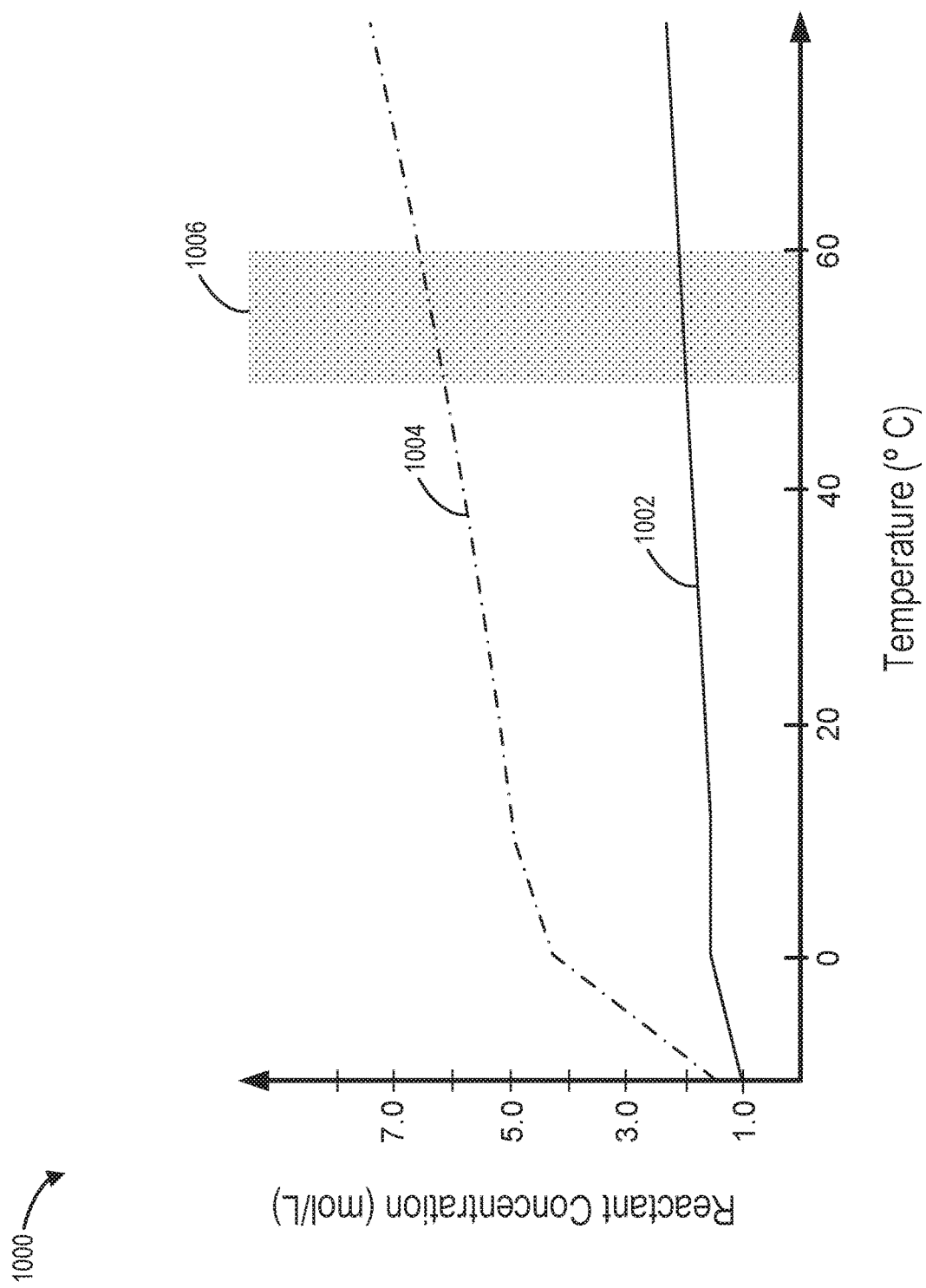
FIG. 10 shows a graph comparing a relationship between reactant concentration and temperature for a first solution including a redox active species and supporting salts and for a second solution including the redox active species without supporting salts.

The following description relates to systems and methods for manufacturing a redox flow battery with reduced cost of storage. The redox flow battery is shown in FIG. 1 with an integrated multi-chamber tank having separate positive and negative electrolyte chambers. The electrolyte chambers may be coupled to one or more battery cells, each cell comprising a negative electrode and a positive electrode. The positive and negative electrolytes may be separated within each of the one or more battery cells by a membrane separator that selectively allows transport of ions across the separator to maintain charge balance across the battery cells. Battery performance may be increased by incorporating an additive into a material of the negative, or plating, electrode. The additive may result in a self-imposed monolayer arrangement of plated material, as illustrated in FIG. 2 by an example of a model of self-assembled plated monolayers. When adapted with the additive-promoted plating as self-assembled monolayers, a redox flow battery may sustain higher plating current density at lower temperatures compared to a conventional redox flow battery, as depicted in FIG. 3. Furthermore, an energy density of a battery electrolyte may be enhanced and battery efficiency improved by implementing an anion exchange membrane separator in the redox flow battery in addition to incorporation of the additive. The plated negative electrode and the anion exchange membrane separator may be installed in a power module of the redox flow battery in a configuration shown in FIG. 4. Overall system costs for a conventional redox flow battery are compared with estimated system costs for the redox flow battery of FIG. 4 in a prophetic chart shown in FIG. 5. An example of a method for operating the redox flow battery is provided in FIG. 6, showing events occurring during charging and discharging of the battery when equipped with an AEM and the plating additive. A schematic diagram of a battery cell of the IFB, including positive and negative electrode compartments separated by a membrane separator, is illustrated in FIG. 7 to show a formation of uniform plated layers around a negative electrode of the battery cell resulting from presence of the additive. In the absence of the additive the coating of metal on to the negative electrode may include cracks, as shown in a first schematic diagram of the negative electrode compartment in FIG. 8, which may lead to degradation of the negative electrode. By including the additive in the negative electrode compartment, formation of the crack-free metal coating may be enabled, as shown in FIG. 9 in a second schematic diagram of the negative electrode compartment. By including the AEM in the IFB, use of costly supporting salts in the IFB electrolytes may be precluded which may increase a solubility of reactants (e.g., redox active species) in the electrolytes. A graph depicting an effect of the AEM, and concomitant absence of supporting salts, on reactant solubility is shown in FIG. 10.

FIGS. 4 and 7-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Hybrid redox flow batteries are redox flow batteries that are characterized by the deposition of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., a maximum amount of energy stored) of the redox battery may be limited by the amount of metal plated during battery charge and may depend accordingly on the efficiency of the plating system as well as the available volume and surface area available for plating.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a battery cell 18 may be referred to as a plating electrolyte, and a positive electrolyte on a redox side (e.g. a positive electrode compartment 22) of the battery cell 18 may be referred to as a redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Alternatively, during discharge, the negative electrolyte and negative electrode may be respectively referred to as an anolyte and anode of the electrochemical reaction, while the positive electrolyte and the positive electrode may be respectively referred to as a catholyte and cathode of the electrochemical reaction. In contrast, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode 26, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+}+2e^- \leftrightarrow Fe^0 -0.44 \text{ V (Negative Electrode)} \quad (1)$$

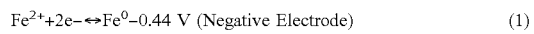

$$Fe^{2+} \leftrightarrow 2\ Fe^{3+}+2e^- +0.77 \text{ V (Positive Electrode)} \quad (2)$$

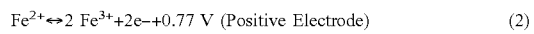

As discussed above, the negative electrolyte used in the IFB may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and may be dissolved back into the electrolyte. The equilibrium potential of the above reaction is −0.44 V and thus, this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77 V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode 26 may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate, causing it to plate onto the negative electrode 26.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as an external positive electrolyte tank 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte chamber 50 to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Plating quality at the negative electrode 26 may impact a performance of the battery system 10. For example, iron may plate from electrolyte onto a surface of the negative electrode 26 according to electrolyte current flow. As a result, deposition of iron may be pronounced on features such as corners, bends or protrusions. Uneven plating may lead to loss of battery efficiency and/or capacity by forming gaps along the surface of the negative electrode 26 where iron is less likely to plate, an effect that becomes further exacerbated by continued accumulation of iron metal onto the protruding features or corners or bends. A uniform deposition of iron onto the negative electrode surface throughout the charging cycle of the battery system 10 may allow for rapid charging and discharging. Increasing a plating thickness of the iron deposited onto the negative electrode 26 may enable prolonged energy storage for the discharge cycle occurring during coupling of the battery system 10 to an electrically powered external device or system. Furthermore, a consistent distribution of iron across the electrode surface may provide even heat distribution, thereby simplifying thermal management of the battery system 10 and leading to faster charging and discharging of the battery system 10 at ambient temperature. Methods to promote uniform iron plating via additive-assisted self-assembly of monolayers will be discussed further below with reference to FIGS. 2, 4-6.

Efficiency losses in an IFB may result from electrolyte crossover through a separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits ferric ion cross-over may also mitigate fouling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

Continuing with FIG. 1, a schematic illustration of the redox flow battery system 10 is shown. The redox flow battery system 10 may comprise the redox flow battery cell 18 fluidly connected to a multi-chambered electrolyte storage tank 110. The redox flow battery cell 18 may generally include the negative electrode compartment 20, separator 24, and positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane.

In some examples, the separator 24 may be formed from an anion exchange membrane that conducts a target anion, such as $Cl^-$, across the separator 24 while inhibiting flow of iron cations ($Fe^{2+}$, $Fe^{3+}$) and iron cation complexes, e.g., $FeCl_4^-$. By configuring the battery system 10 with the anion exchange membrane, an amount of electrolyte solution and number of chemical species may be reduced. In other words, by adapting the separator 24 as an anion exchange membrane, the electrolytic species include active materials such as $FeCl_2$ and $FeCl_3$ without additional supporting redox inactive electrolytes. In another example, by adapting the separator 24 as an anion exchange membrane, the electrolytic species may include only active materials such as $FeCl_2$ and $FeCl_3$, which, when dissolved in aqueous solution, provides iron cations that undergo redox reactions as well as chloride anions for charge balance, without additional supporting redox inactive electrolytes. As a result, a volume of electrolyte may be reduced while a concentration of active materials is increased, allowing for a smaller and less expensive storage tank to be used. Further details of the anion exchange membrane separator will be provided with reference to FIGS. 3-6.

The negative electrode compartment 20 may comprise the negative electrode 26, and the negative electrolyte may comprise electroactive materials. The positive electrode compartment 22 may comprise the positive electrode 28, and the positive electrolyte may comprise electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell, and are pumped via negative and positive electrolyte pumps 30 and 32 through the negative electrode compartment 20 side and the positive electrode compartment 22 side of the battery, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates may be arranged proximate but spaced away from the electrodes within the respective electrode compartments. The IFB electrolytes may be transported to reaction sites at the negative and positive electrodes 26 and 28 by the first and second bipolar plates 36 and 38, resulting from conductive properties of a material of the bipolar plates 36, 38. Electrolyte flow may also be assisted by the negative and positive electrolyte pumps 30 and 32, facilitating forced convection through the redox flow battery cell 18. Reacted electrochemical species may also be directed away from the reaction sites by the combination of forced convection and the presence of the first and second bipolar plates 36 and 38.

As illustrated in FIG. 1, the redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and may induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further comprise the integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. A such, the stored hydrogen gas can aid in purging other gases from the multi-chamber storage tank 100, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank 110 can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber 52 includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples, the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers 50, 52 in response to a liquid level decreasing below a solids fill threshold level. Said in another way, controller 88 may activate the one or more heaters in the negative and positive electrolyte chambers 50, 52 only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further still, one or more inlet connections may be provided to each of the negative and positive electrolyte chambers 50, 52 from a field hydration system (not shown). In this way, the field hydration system can facilitate commissioning of the redox flow battery system, including installing, filling, and hydrating the system, at an end-use location. Furthermore, prior to its commissioning at the end-use location, the redox flow battery system may be dry-assembled at a battery manufacturing facility different from end-use location without filling and hydrating the system, before delivering the system to the end-use location. In one example, the end-use location may correspond to the location where the redox flow battery system 10 is to be installed and utilized for on-site energy storage. Said in another way, it is anticipated that, once installed and hydrated at the end-use location, a position of the redox flow battery system 10 becomes fixed, and the redox flow battery system 10 is no longer deemed a portable, dry system. Thus, from the perspective of a redox flow battery system end-user, the dry portable redox flow battery system 10 may be delivered on-site, after which the redox flow battery system 10 is installed, hydrated and commissioned. Prior to hydration the redox flow battery system 10 may be referred to as a dry, portable system, the redox flow battery system 10 being free of or without water and wet electrolyte. Once hydrated, the redox flow battery system 10 may be referred to as a wet non-portable system, the redox flow battery system 10 including wet electrolyte.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence a packed catalyst bed.

During operation of the redox flow battery system 10, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. Sensors may be positioned at other locations throughout the redox flow battery system 10 to monitor electrolyte chemical properties and other properties. For example a sensor may be positioned in an external acid tank (not shown) to monitor acid volume or pH of the external acid tank, wherein acid from the external acid tank is supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, controller 88 may send signals to actuators such as valves and pumps of the field hydration system during hydration of the redox flow battery system 10. Sensor information may be transmitted to a controller 88 which may in turn actuate pumps 30 and 32 to control electrolyte flow through the cell 18, or to perform other control functions, as an example. In this manner, the controller 88 may be responsive to, one or a combination of sensors and probes.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110. The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example an increase in pH of the negative electrolyte chamber 50, or the negative electrode compartment 20, may indicate that hydrogen is leaking from the redox flow battery system 10 and/or that the reaction rate is too slow with the available hydrogen partial pressure, and controller 88, in response to the pH increase, may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$. Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system 10. For example the time period may be reduced if the recirculation rate is high, and local changes in concentration (e.g., due to side reactions or gas leaks) may quickly be measured since the time constants may be small.

As described above, an overall performance of a redox flow battery may be improved by a combination of uniform, thick, reversible plating of metal onto a negative (plating) electrode and presence of an anion exchange membrane separator controlling flow of ions between a positive electrode compartment and a negative electrode compartment of a battery cell. In an iron redox flow battery (IFB) system, ferrous iron, $Fe^{2+}$ is reduced to iron metal, $Fe^0$, at the negative electrode, resulting in deposition of the metal during the IFB charging cycle. Formation of continuous, uniform, and crack-free plated layers that coat a surface of the negative electrode may reduce a likelihood of uneven current density across a surface of the negative electrode which may lead to development of localized heating that degrades the electrode and diminishes the electrode lifetime. In addition, as the IFB may undergo tens of thousands of charge/discharge cycles, maintaining uniform plating over the cycles is highly desirable.

Furthermore, in order to achieve 100 hours of energy storage in the IFB at a target power level, a desirable plating thickness may be greater than 1 cm. The increased plating thickness, as compared to plating in conventional redox flow battery systems, may provide a sufficient amount of plated iron on the negative electrode to continuously oxidize elemental iron to ferrous ion over a period of 100 hours during battery discharge. To obtain consistently uniform and reversible plating, an additive may be used to induce deposition of plated iron in self-assembled monolayers, as shown in FIGS. 2 and 7.

A small quantity of an additive may be added to a negative electrolyte solution, e.g., the negative electrolyte stored in the negative electrode compartment 20 of FIG. 1, at millimolar (mM) concentrations so that the presence of the additive does not affect system costs or overall energy and power density. A model 200 of a self-assembly of monolayers with an additive 202 is shown in FIG. 2. The additive 202 may be a fatty acid, such as stearic acid 202, which may interact with an iron center 204 at an electron-rich carboxylate functional end group 206 of the stearic acid molecule. For the redox flow battery system 10 of FIG. 1, in the case of an IFB system, the negative (plating) electrode 26 may include an iron substrate (including one or more iron center 204). The functional end group 206 may form a chemical bond with the iron center 204. A long-chain carbon tail 208 of stearic acid 202 may trail from the adsorbed functional end group 206, away from the iron center 204. The trailing carbon tail 208 may be much longer in length than the functional end group 206 of stearic acid 202. For example, the carbon tail 208 may be a first length 203, such as 2.15 nm, while the functional end group 206 may be a second, shorter length 205, such as 0.15 nm, as shown in FIG. 2. Van der Waals interactions between each stearic acid carbon tail 208 and adjacent carbon tails may result in a tight packing arrangement of each layer of plated iron to reduce a free energy of each layer. Each consecutive plated layer may be similarly packed as a new monolayer adjacent to a previously plated monolayer, forming a stack 210 of evenly spaced apart monolayers of iron that are separated by layers of stearic acid carbon tails surrounding each iron center 204. A stacking of monolayers of iron are depicted in a schematic diagram 700 in FIG. 7.

The schematic diagram 700 shows a battery cell 702, which may be a non-limiting example of the battery cell 18 of FIG. 1. The battery cell 702 includes a negative electrode compartment 704 with a negative electrode 706 submerged in a negative electrolyte 708. The negative electrode compartment 704 may be separated from a positive electrode compartment 710, containing a positive electrode 712 submerged in a positive electrolyte 714, by a membrane separator 716. In the example shown in FIG. 7, the membrane separator 716 is an anion exchange membrane (AEM) separator 716, allowing only anions 720 to pass therethrough. In other examples, however, the membrane separator 716 may be configured to be a cation exchange membrane separator or a microporous substrate.

Both the negative electrolyte 708 and the positive electrolyte 714 comprise cations 718 (e.g., $Fe^{2+}$, $Fe^{3+}$), which may each be the iron center 204 of FIG. 2, and anions 720 (e.g., $Cl^-$). The negative electrolyte 708 may additionally include additive molecules 722, such as the stearic acid 202 of FIG. 2, which bind with the cations 718 at one end to form complexes 724. A number of additive molecules 722 bound to each of the cations 718 may vary. For example, complexes 724 with one, two, or four bound additive molecules 722 are shown in FIG. 7 but complexes with other quantities of bound additive molecules 722, such as three, five, or six, have been contemplated.

The complexes 724 may plate onto the negative electrode 706 and form consecutive self-assembled monolayers 726, similar to the stack 210 of iron monolayers shown in FIG. 2. Each layer of the monolayers 726 of iron may have a uniform thickness, defined in a direction perpendicular from a surface 728 of the negative electrode 706, along a portion of the surface 728 of the negative electrode 706 that is in contact with the negative electrolyte 708, e.g., submerged in the negative electrolyte 708. A stacking of uniform monolayers 726 of iron onto the negative electrode 706 may allow for a plating thickness 730, also defined in a direction perpendicular to the surface 728 of the negative electrode 706, of greater than 1 cm while maintaining a consistent thickness of the plating thickness 730 across the surface 728 of the negative electrode. The plating thickness 730 may represent a sum of the thicknesses of each layer of the stacked monolayer 726 of iron.

It will be appreciated that while use of stearic acid in the IFB is described, with respect to FIG. 2, numerous other types of fatty acids or surfactants may be used to promote self-assembly of the plated iron into monolayers without departing from the scope of the present disclosure. For example, various other additives which include a functional end group interacting and binding to iron cations, as well as a chemically inert tail formed from a hydrocarbon chain, may be used in place of stearic acid.

Figure 8:
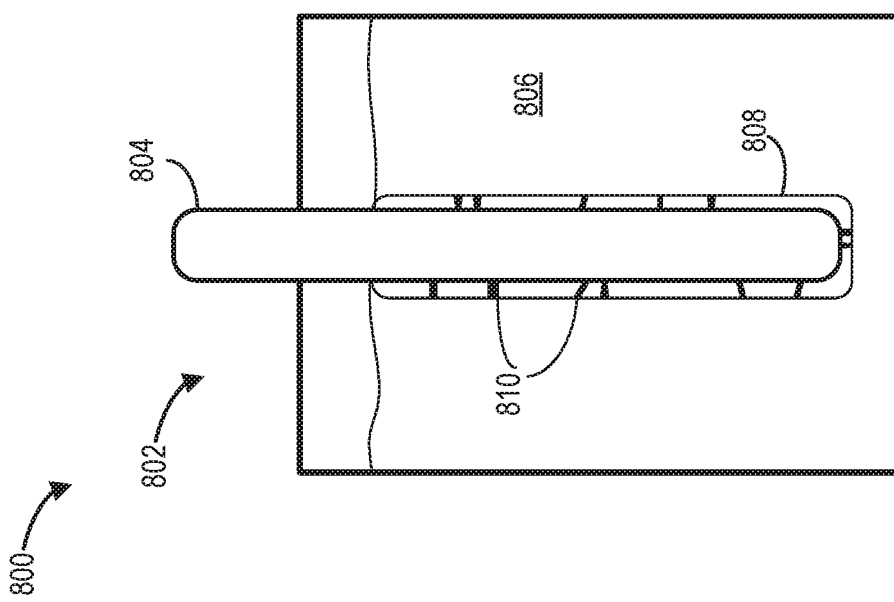
FIG. 8 shows a first schematic diagram of an example of the negative electrode compartment without a plating additive where the negative electrode is coated with a cracked coating of plated metal.

The additive, which may be stearic acid in one example, may promote self-assembled monolayers that form an overall crack-free coating of iron on the negative electrode. For example, a first schematic diagram 800 of a negative electrode compartment 802, similar to the negative electrode compartment 20 of FIG. 1 and 704 of FIG. 7, is shown in FIG. 8. A portion of a negative electrode 804 is submerged in a first negative electrolyte 806 which may contain a mixture of metal cations and anions in aqueous solution. Upon reduction, the metal may plate onto the negative electrode 804 forming a coating 808. The coating 808 includes cracks 810, which may be gaps in the coating 808 forming as a result of topographic features or an uneven texture of a surface of the negative electrode 804.

A presence of cracks 810 in the coating 808 disrupts electrical conductivity through the coating 808. Uneven distribution of current may result, causing uneven heating and formation of hotspots along the surface of the negative electrode 804. Degradation of the negative electrode 804 may occur due to the uneven heating.

In contrast, a second schematic diagram 900 shown in FIG. 9 of the negative electrode compartment 802 may store a second negative electrolyte 902. The second negative electrolyte 902 may be a mixture of metal cations, anions, and an additive, such as stearic acid. Upon reduction of ferrous iron at the negative electrode 804, the metal may plate onto the negative electrode 804 in self-assembled monolayers, as described in FIGS. 2 and 7, resulting in deposition of a smooth, continuous, and crack-free coating 904 of metal. A continuity of current flow through the coating 904 is maintained, allowing for even heating of the negative electrode 804 and preserving and prolonging an integrity of the negative electrode 804.

The additive may, in addition to promoting formation of organized and crack-free layers of plated iron, inhibit corrosion of the iron-plated negative electrode. For example, as shown in FIG. 7, each iron center may adsorb more than one stearic acid functional end group and be surrounded by more than one attached stearic acid tail, the plurality of stearic acid tails around each iron center providing a coating around the iron centers that reduces oxidation of iron during storage or when the IFB is in an idle state.

Compared to IFB systems operating without plating additives, the self-assembled monolayer plating of iron, as described above, may allow plating and deplating (e.g., electron exchange between $Fe^0$ to $Fe^{2+}$) to occur at lower temperature, such as ambient temperature, in the IFB when implemented with suitable system control logics. Conventional iron flow batteries may operate at elevated temperatures of 50-65° C., for example, to achieve high charging efficiency, adding complexity and consuming energy in order to heat the IFB to provide a desirable power output. Operation of the IFB at ambient temperature rather than higher temperatures may simplify the system and reduce overall costs.

A comparison of plating current density between a conventional IFB and the IFB configured to plate iron in self-assembled monolayers is shown in a graph 300 in FIG.

3. Graph 300 depicts a maximum plating current density in mA/cm² increasing upwards along the y-axis and electrolyte temperature increasing to the right along the x-axis. A first plot 302 of an IFB with a conventional plating system, e.g., no additive, is given in graph 300 along with a second plot 304 of an IFB with an additive, such as stearic acid, to promote self-assembly of monolayers during iron plating.

At ambient temperature ($T_{amb}$), a difference in maximum plating current density between the first plot 302 and the second plot 304 is greatest. The second plot 304 indicates that the additive-equipped IFB may support a maximum plating current density that is higher than a maximum plating current density shown by the first plot 302 when equal reversibility and plating quality is demonstrated by both systems. The difference in plating current density between the first plot 302 and second plot 304 decreases as temperature increases, with the second plot 304 consistently higher than the first plot 302 until the plots merge at a terminal high end temperature. The results shown in graph 300 indicate that uniform, crack-free plating of iron together with pulse charging allows significantly thicker plating of iron onto a negative electrode of the IFB without adversely affecting battery performance at relatively low operating temperatures. A deviation between plating current density of the second plot 304 versus the first plot 302 is most pronounced at ambient temperature. Thus, the system represented in plot 304 may support greater plating thickness on the negative electrode without causing significant electrolyte volume change, drop in pressure, or cell clogging over 100 hours of storage.

Furthermore, high efficiency charging of conventional redox flow batteries may be associated with high plating overpotentials which may lead to hydrogen evolution at the negative electrode. In the IFB system with self-assembled monolayers of plated iron, pulse charging may reduce plating overpotential and further assist in uniform iron plating by decreasing iron grain size. In some example, pulse charging, in combination with the additive, may assist in reducing electrode overpotential, thus reducing a likelihood of hydrogen generation at the negative electrode.

Energy density of the IFB may also be enhanced by implementing an anion exchange membrane (AEM) as a separator between a negative electrode compartment and a positive electrode compartment. Incorporation of the AEM, in addition to an additive to control iron plating, may also decrease storage costs to, for example, $10 per kilowatt hour by eliminating supporting electrolytes, such as KCl, and demonstrate greater than 60% round trip efficiency of the IFB. The AEM may interact with anions, such as and not cations, such as $Fe^{2+}$ and $Fe^{3+}$, allowing anion transport across electrode compartments via an anion exchange mechanism. In addition, with application of AEM and elimination of supporting electrolytes, reactants concentration in water can be significantly increased, i.e. the overall system energy efficiency can be increased.

For example, as shown in FIG. 7, anions 720 may flow across the AEM separator 716 between the negative electrode compartment 704 and positive electrode compartment 710 but not the metal cations 718, the additive molecules 722, or the complexes 724. In one example, the anions 720 may be $Cl^-$ in an IFB system. As described above, the anions 720 may be transported across the AEM separator 716 in response to the charge imbalance in the battery cell 702. For example, generation of $H_2$ during IFB operation, as described above with reference to FIG. 1, may result in uneven distribution of charges between the positive electrode compartment 710 and the negative electrode compartment 704. The charge imbalance may be alleviated by enabling the anions 720 to flow across the AEM separator 716, either in a first direction from the negative electrode compartment 704 to the positive electrode compartment 710 as indicated by arrow 703 or in a second direction from the positive electrode compartment 710 to the negative electrode compartment 704 as indicated by arrow 705. Anion transport may occur during regular charge and discharge reaction of the IFB, allowing, for example, only or mostly movement across the AEM separator 716.

For example, when an overall charge balance of the positive electrode compartment 710 is biased positive while an overall charge balance of the negative electrode compartment 710 is neutral, the anions 720 may flow along the first direction as indicated by arrow 703 to neutralize the overall positive charge. Similarly, when the overall charge balance of the negative electrode compartment 710 is biased positive while the overall charge balance of the positive electrode compartment 703 is neutral, the anions 720 may flow along the second direction, as indicated by arrow 705. As such, charge balance in the battery cell 702 may be restored and stable operation of the IFB is maintained.

Furthermore, implementation of the AEM separator 716 may hinder cross-over of iron cations between the positive electrode compartment 710 and the negative electrode compartment 704. By inhibiting migration of iron cations across the AEM separator 716, precipitation of $Fe(OH)_3$ is circumvented and a likelihood of membrane fouling at the AEM separator 716 is reduced. As well, loss of iron due to $Fe(OH)_3$ formation may be mitigated.

Equipping the IFB with the AEM separator may also decrease an overall cost of the IFB. By inhibiting cation flow, use of supporting electrolyte to increase a conductivity of the solution may be eliminated. In conventional redox flow battery systems, supporting electrolyte, comprising electrically conductive species in solution that do not participate in the redox reactions of the redox flow battery, may impose significant additional costs. However, the IFB may be configured to instead rely on electrolyte containing exclusively electroactive species involved in iron redox chemistry when the AEM separator is installed, thereby increasing energy density and decreasing system costs. A lesser volume of electrolyte may be used with up to a twofold increase in concentration of redox active iron species providing a suitable amount of $Fe^{2+}$ to enable an iron plating of greater than 1 cm thickness.

Various types of AEMs may be considered to form the separator. For example, a polymer network of the separator membrane may include heteroaromatic compounds, aniline, olefins, or sulfones as building blocks. Alternatively, the membrane may be formed from a covalent organic framework or include pH resistant functional groups. The AEM may be fabricated by numerous methods including grafting, surface coating, solvent casting, conformal coating or, as another example, may be commercially available.

Eliminating supporting salts from electrolyte of an IFB system may result in increased energy density of the IFB. As described above, implementation of an AEM allows exclusive dissolution of redox active species in the electrolyte thereby enhancing a solubility of the redox active species in a given volume of electrolyte. As an example, solubility of the redox active species without presence of supporting salts is compared with solubility of the redox active species with supporting salts included in an electrolyte in graph 1000, as depicted in FIG. 10.

Graph 1000 shows a temperature of the electrolyte increasing to the right along the x-axis and a concentration of a reactant or redox active species in solution, e.g., an amount of the redox active species dissolved in water, increasing upwards along the y-axis. The redox active species may be $FeCl_2$ and/or $FeCl_3$. A first plot 1002 represents a concentration of the reactant with supporting salts also dissolved in the solution and a second plot 1004 represents a concentration of the reactant without presence of the supporting salts. When the temperature is low, such as at −10° C., a solubility of the reactant may be similar with or without the presence of the supporting salts.

As the temperature increases, the first plot 1002 and the second plot 1004 diverge, with the concentration of the reactant rising more rapidly in the second plot 1004 than the first plot 1002. Above 0° C., solubility of the reactant increases in both plots but reactant solubility is consistently higher in the second plot. For example, in an operating temperature range of an IFB of between 50-60° C., as indicated by shaded area 1006, the concentration of the reactant is at least three times higher than the reactant concentration when the supporting salts are present. Thus, the presence of supporting salts may suppress reactant solubility, decreasing an amount of redox active species able to engage in charge/discharge cycles of the IFB.

The solubility of the redox active species may be directly correlated to an energy density of the IFB. Increasing the solubility of the redox active species may result in higher energy density while reducing the solubility of the redox active species may decrease the IFB energy density. With respect to graph 1000, the greater solubility of the reactant at temperatures between 50-60° C., as indicated by shaded area 1006, may result in a greater than twofold increase in energy density of the IFB. Elimination of the supporting salts may thereby enhance an efficiency of the IFB system.

Figure 4:
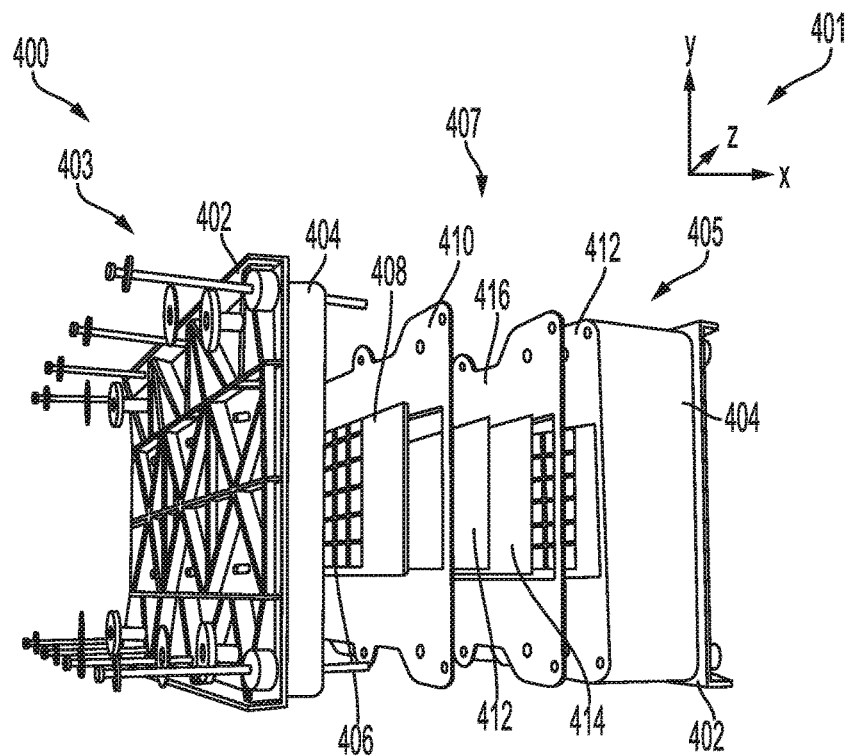
FIG. 4 shows an example of a power module of the redox flow battery.

An IFB system may include a power module adapted with both an additive to encourage uniform plating and an AEM as a separator between a negative electrode and a positive electrode, the AEM having inherent ion selectivity. An example of a power module 400 that may be used in a redox flow battery system, such as the redox flow battery system of FIG. 1, is shown in FIG. 4. A set of reference axis 401 is provided, indicating a y-axis, an x-axis, and a z-axis. The power module 400 comprises a series of components arranged as layers within the power module 400. The layers may be positioned co-planar with a y-x plane and stacked along the z-axis.

Pressure plates 402 may be arranged at a first end 403 and a second end 405 of the power module 400 that provide rigid end walls that define boundaries of the power module 400. The pressure plates 402 allow layers of the power module 400 to be pressed together between the pressure plates 402 to seal components of the power module within an interior 407 of the power module 400. Picture frames 404 may be arranged inside of the pressure plates, e.g., against sides of the pressure plates facing inwards along the z-axis, towards the interior 407 of the power module 400, the picture frames 404 adapted to interface with one another to seal fluids within the interior 407 of the power module 400.

Elements of the power module 400 are now described along a direction from the first end 403 towards the second end 405. A negative spacer 406 is arranged adjacent to one of the picture frames 404 positioned at the first end 403, the negative spacer 406 defining flow channels along a surface of a negative electrode. A bipolar plate 408, which may have an integrated negative electrode along a surface of the bipolar plate 408 in face-sharing contact with the negative spacer 406, is positioned between the negative spacer 406 and surrounded by a bipolar plate frame plate 410 that provides structural support.

A positive electrode 412, which may be a sheet of graphite felt, is arranged along a face of the bipolar plate 408 opposite of the negative spacer 406. A membrane 414, surrounded by a membrane frame plate 416 for structural support, may be positioned adjacent to the positive electrode 412, on a side of the positive electrode facing the second end 405 of the power module 400. The membrane 414 may be adapted as an anion exchange membrane, transporting anions across the membrane 414 but not cations or complexes. The components described above, e.g., the negative spacer 406, the bipolar plate 408, the positive electrode 412, and the membrane 414 may repeat within the power module, from the first end 403 to the second end 405, a number of times, forming a battery stack. Negative electrolyte, including an additive such as stearic acid, may be contained between another membrane, arranged on a side of the bipolar plate 408 towards the first end 403 of the power module 400, and the bipolar plate 408, the negative electrolyte in contact with both the negative spacer 406 and integrated negative electrode (e.g., integrated into the surface of the bipolar plate 408). Positive electrolyte may be contained between the bipolar plate 408 and the membrane 414, in contact with the positive electrode 412.

Figure 5:
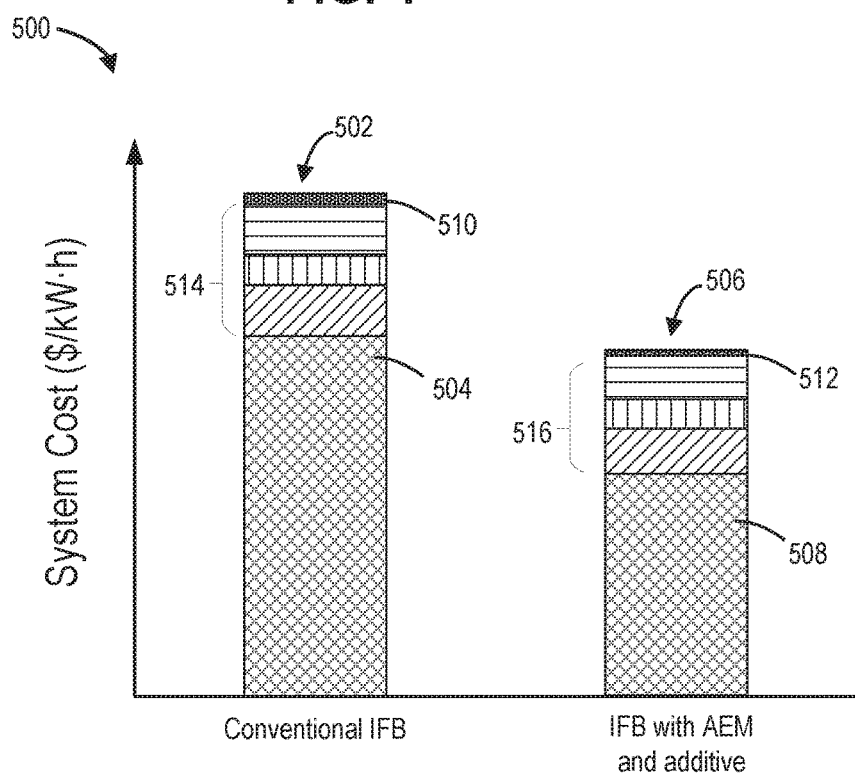
FIG. 5 shows a chart comparing storage costs of a conventional redox flow battery system with storage coats of the redox flow battery system adapted with the anion exchange membrane separator and increased plating thickness.

Estimated reductions in system costs resulting from adapting an IFB with an AEM and an additive for uniform iron plating is compared to costs of a conventional IFB in a prophetic chart 500 illustrated in FIG. 5. System costs in dollars per kilowatt hour is shown increasing upwards along a y-axis of chart 500 over a 100 hour storage period at a rated power. A first column 502 shows a system cost breakdown for a conventional IFB. A majority of system costs may be attributed to electrolyte, represented by a first hatched area 504 in the first column 502. In a second column 506, a majority portion of a system cost of an AEM and additive-adapted IFB is similarly attributable to electrolyte and represented by a second hatched area 508. The electrolyte may include both redox active species and supporting salts. However, the amount due to electrolyte in the second column 506 is reduced compared to the first column 502, indicating a cost savings of, for example, 30%. The lower electrolyte costs for the second column 506 may results from a decreased volume of electrolyte in the IFB when the AEM is implemented, as described above. The decreased volume of electrolyte may increase an energy density of the electrolyte by increasing a concentration of the redox active species such as $FeCl_2$ and $FeCl_3$. In addition, use of expensive supporting salts, e.g., electrically conductive species that do not participate in redox reactions of the IFB, may be precluded, thereby further reducing system costs.

Other variables contributing to system costs, such as thermal management systems, represented by a first shaded area 510 in the first column 502 and by a second shaded area 512 in the second column 506 may show a smaller relative area in the second column 506 relative to the first column 502 as a result of additive use to plate uniform layers onto a negative electrode of the IFB. Other elements contributing to overall system costs, represented by a third shaded area 514 in the first column 502 may represent a larger area, and therefore cost, compared to a fourth shaded area 516 in the second column 506.

An example of a method 600 for operating an iron redox flow battery (IFB) system is shown in FIG. 6. The IFB may include a negative electrolyte with a small amount (e.g., millimolar concentration) of an additive. The additive may be a fatty acid, such as stearic acid, with a functional end group configured to interact with iron as well as a chemically inert carbon tail that does not interact with electroactive species in the electrolyte. The IFB may also include a membrane separator positioned between a negative electrode and a positive electrode and configured to moderate exchange of ions between the negative electrolyte, in contact with the negative electrode, and a positive electrolyte, in contact with the positive electrode. In one example, the membrane separator may be an anion exchange membrane (AEM) separator, such as the AEM separator 716 of FIG. 7, enabling flow of anions across the AEM.

It will be appreciated that method 600 may be similarly applied to an IFB system using the plating additive and incorporating a cation exchange membrane separator or a microporous substrate in place of the AEM separator. Such alternatives to the AEM separator may enable transport of chemical species other than anions across the membrane separator.

At 602, the method includes charging the IFB to store energy via a charging process. In some examples, charging the IFB may be achieved by pulse charging. Application of pulse charging, where a series of voltage or current pulses is applied to the IFB, may result in a reduction of an overpotential of the negative electrode. The use of pulse charging may mitigate overheating of the battery during charging. The charging process may include applying a current to the IFB to reduce ferrous iron in the negative electrolyte to iron metal and plate the iron metal onto the negative electrode at 604. Simultaneously, ferrous iron may be oxidized to ferric iron in the positive electrolyte at the positive electrode. The additive may interact with the iron so that the iron plates onto the electrode in self-assembled monolayers. The plated monolayers of iron form an even, uniform coating on the negative electrode, allowing for even heat distribution across the negative electrode. The plated iron may form a coating greater than 1 cm thick.

Charging the IFB may also include transporting ions, specifically, anions such as chloride, across the AEM separator at 606. The anions may flow across the AEM separator by an anion exchange mechanism while exchange of cations across the AEM separator is inhibited. By allowing anions to be exchanged between the positive electrolyte and negative electrolyte, a charge balance of the IFB system may be maintained.

In another example where the membrane separator is configured as the cation exchange membrane, cations such as $H^+$ may be allowed to flow across the membrane separator while exchange of anions is inhibited. In yet another example where the membrane separator is replaced by a microporous substrate, both cations, such as $K^+$, $H^+$, and anions, such as $Cl^-$, $FeCl_4^-$, are transported. In each of the alternate embodiments of the membrane separator, the charge balance of the IFB system may be similarly maintained.

At 608, the method includes discharging the IFB to provide power to an external system. Discharging the IFB may include, at 610, flowing a current to the external system from the IFB as iron metal is oxidized to ferrous iron at the negative electrode and ferric iron is reduced to ferrous iron at the positive electrode. Anions may be transported across the AEM separator at 612 of the method during discharge, providing charge balance between the positive and negative electrolytes. By adapting the IFB with the additive in the negative electrolyte and the AEM separator, discharge of the IFB may provide, for example, up to 100 hours of energy storage to power the external system.

In this way, a performance of a redox flow battery may be improved while reducing system costs. The redox flow battery may include an additive in an electrolyte solution in contact with a negative electrode of the battery. The additive may be a material that interacts with electroactive cations in the electrolyte and promotes plating of a metal onto the negative electrode in self-assembled monolayers, forming a uniform, crack-free coating of metal. The arrangement of the plated metal in monolayers allows even heating of the negative electrode, simplifying thermal management of the battery, and enables increased plating thickness without adversely affecting battery performance. By increasing the plating thickness, an energy storage capacity of the redox flow battery is enhanced. The technical effect of adapting the redox flow battery with the additive is that a cycling capacity of the battery is increased while cost per energy unit is decreased.

In one embodiment, a redox flow battery system includes a battery cell with a positive electrolyte and a negative electrolyte, the positive electrolyte in contact with a positive electrode and the negative electrolyte in contact with a negative electrode, a plating additive added to the negative electrolyte, the plating additive interacting with cations of the negative electrolyte and forming complexes that plate onto the negative electrode in self-assembled monolayers. In a first example of the system, during charging of the system, a metal is plated onto the negative electrode and wherein in the presence of the plating additive, a plating thickness of the metal onto the negative electrode is greater than when the additive is absent from the redox flow battery. A second example of the system optionally includes the first example, and further includes wherein in the presence of the plating additive, a plating rate of the metal onto the negative electrode is greater than when the additive is absent from the redox flow battery and wherein the plating rate remains greater than when the additive is absent even when a temperature of the redox flow battery system is below a threshold temperature. A third example of the system optionally includes one or more of the first and second examples, and further includes, wherein in the presence of the plating additive, a uniformity of a coating formed by the plating of the metal onto the negative electrode is increased relative to when the additive is absent from the redox flow battery. A fourth example of the system optionally includes one or more of the first through third examples, and further includes, wherein in the presence of the plating additive, a presence of cracks in the coating is reduced relative to when the additive is absent from the redox flow battery. A fifth example of the system optionally includes one or more of the first through fourth examples, and further includes, wherein the plating additive has a functional end group at a first end that binds to the metal and a trailing, chemically inert tail at a second end that extends away from the metal. A sixth example of the system optionally includes one or more of the first through fifth examples, and further includes, wherein the metal, chemically bound by the plating additive, plates onto the negative electrode as a stack of evenly spaced apart monolayers of the metal that are separated by layers formed of the trailing, chemically inert tail of the plating additive. A seventh example of the system optionally includes one or more of the first through sixth examples, and further includes, wherein the plating additive includes a fatty acid with an electron-rich functional end group and a long-chain carbon tail. An eighth example of the system optionally includes one or more of the first through seventh examples, and further includes, wherein the plated metal is configured to coat the negative electrode with a thickness between several mm to over 1 cm.

In another embodiment, a method includes during a charging cycle of the redox flow battery system, plating a metal from an electrolyte solution, the electrolyte solution containing an additive, onto a negative electrode to form uniform and crack-free layers of metal, and during a discharging cycle of the redox flow battery system, deplating the metal from the negative electrode into the electrolyte solution. In a first example of the method, ions are transport across a membrane separator along a first direction during the charging cycle of the redox flow battery system and transporting ions across the membrane along a second, opposite direction during the discharging cycle of the redox flow battery system and wherein the membrane separator separates a negative electrode compartment from a positive electrode compartment of the redox flow battery system. A second example of the method optionally includes the first example, and further includes, wherein transporting ions across the membrane separator includes transporting anions across an anion exchange membrane separator. A third example of the method optionally includes one or more of the first and second examples, and further includes, wherein transporting ions across the membrane separator includes transporting cations across a cation exchange membrane separator. A fourth example of the method optionally includes one or more of the first through third examples, and further includes, wherein transporting ions across the membrane separator includes transporting ions across a microporous substrate. A fifth example of the method optionally includes one or more of the first through fourth examples, and further includes, wherein plating the metal onto the negative electrode includes forming self-assembled monolayers of the metal onto a surface of the negative electrode. A sixth example of the method optionally includes one or more of the first through fifth examples, and further includes, wherein forming self-assembled monolayers of the metal on the surface of the negative electrode includes stacking successive layers of metal atoms along a direction perpendicular to a surface of the negative electrode. A seventh example of the method optionally includes one or more of the first through sixth examples, and further includes, wherein forming self-assembled monolayers includes forming chemical bonds between the additive and the metal so that the metal is surrounded by chemically inert tails of the additive.

In yet another embodiment, an iron redox flow battery includes an electrolyte formed from iron chloride complexes in aqueous solution in contact with a positive electrode and a negative electrode, a chemical substance added to the electrolyte that bonds with iron centers from the iron chloride complexes at a first end of the substance and forms a coating around each of the iron centers and wherein the coating is formed from an inert tail at a second end of the chemical substance. In a first example of the battery, the inert tail of the chemical substance is a carbon chain and wherein the coating surrounding each of the iron centers spaces the iron centers at uniform distances from one another. A second example of the battery optionally includes the first example, and further includes, wherein the chemical substance is stearic acid.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a redox flow battery system comprising:
   during a charging cycle of the redox flow battery system,
      plating a metal from an electrolyte solution, the electrolyte solution containing an additive, onto a negative electrode to form uniform and crack-free layers of metal; and
   during a discharging cycle of the redox flow battery system,
      deplating the metal from the negative electrode into the electrolyte solution,
   wherein the additive is a fatty acid with a functional group configured to interact with cations of the metal by surrounding each of the cations and assembling the metal into monolayers, the monolayers separated by layers of the fatty acid to reduce a free energy of the metal; and
   wherein the cations are in a divalent and a trivalent state.

2. The method of claim 1, further comprising transporting ions across a membrane separator along a first direction during the charging cycle of the redox flow battery system and transporting ions across the membrane along a second, opposite direction during the discharging cycle of the redox flow battery system and wherein the membrane separator separates a negative electrode compartment from a positive electrode compartment of the redox flow battery system.

3. The method of claim 2, wherein transporting ions across the membrane separator includes transporting anions across an anion exchange membrane separator.

4. The method of claim 2, wherein transporting ions across the membrane separator includes transporting cations across a cation exchange membrane separator.

5. The method of claim 2, wherein transporting ions across the membrane separator includes transporting ions across a microporous substrate.

6. The method of claim 1, wherein plating the metal onto the negative electrode includes forming the monolayers of the metal by self-assembly onto a surface of the negative electrode.

7. The method of claim 6, wherein forming the monolayers of the metal on the surface of the negative electrode by self-assembly includes stacking successive layers of metal atoms along a direction perpendicular to a surface of the negative electrode.

8. The method of claim 7, wherein forming the monolayers by self-assembly includes forming chemical bonds between the additive and the metal so that the metal is surrounded by chemically inert tails of the additive.

9. The method of claim 1, wherein the functional group of the fatty acid is a carboxylate.

10. The method of claim 1, wherein the fatty acid is stearic acid.

* * * * *